(12) United States Patent
Koskela et al.

(10) Patent No.: US 8,213,360 B2
(45) Date of Patent: Jul. 3, 2012

(54) APPARATUS AND METHOD FOR FLEXIBLE SWITCHING BETWEEN DEVICE-TO-DEVICE COMMUNICATION MODE AND CELLULAR COMMUNICATION MODE

(75) Inventors: Timo Kalevi Koskela, Oulu (FI); Tao Chen, Oulu (FI)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 12/432,460

(22) Filed: Apr. 29, 2009

(65) Prior Publication Data

US 2010/0279672 A1 Nov. 4, 2010

(51) Int. Cl.
*H04W 4/00* (2009.01)
*H04J 3/16* (2006.01)
(52) U.S. Cl. ........................ 370/328; 370/466
(58) Field of Classification Search ............ 370/328
See application file for complete search history.

(56) References Cited

U.S. PATENT DOCUMENTS

| 6,047,178 | A | 4/2000 | Frlan | |
|---|---|---|---|---|
| 6,415,146 | B1* | 7/2002 | Capece | 455/517 |
| 2003/0165161 | A1* | 9/2003 | Kalliokulju et al. | 370/466 |
| 2003/0219014 | A1* | 11/2003 | Kotabe et al. | 370/375 |
| 2004/0248615 | A1 | 12/2004 | Purkayastha et al. | |
| 2007/0047581 | A1* | 3/2007 | Fong et al. | 370/469 |
| 2008/0176595 | A1 | 7/2008 | Karaoguz | |
| 2009/0291702 | A1* | 11/2009 | Imai et al. | 455/517 |
| 2010/0189075 | A1* | 7/2010 | Iwamura et al. | 370/331 |
| 2010/0296427 | A1* | 11/2010 | Lohr et al. | 370/312 |

FOREIGN PATENT DOCUMENTS

| EP | 1320274 A2 | 6/2003 |
|---|---|---|
| EP | 2015526 A2 | 1/2009 |
| WO | 0162026 A1 | 8/2001 |
| WO | WO 2005/060182 A1 | 6/2005 |

OTHER PUBLICATIONS

International Search Report and Written Opinion of the International Searching Authority for corresponding International Patent Cooperation Treaty Application PCT/IB2010/000999, dated Sep. 8, 2010, 21 pages.

\* cited by examiner

*Primary Examiner* — Jeffrey Pwu
*Assistant Examiner* — Gerald Smarth
(74) *Attorney, Agent, or Firm* — Harrington & Smith

(57) ABSTRACT

In accordance with an example embodiment of the present invention, a method is disclosed that comprises receiving a control command to switch from a first communication mode to a second communication mode from a coupled controller; reconfiguring a plurality of protocol entities including at least a first protocol buffer and a second protocol buffer; moving remaining data packets in the first protocol buffer into at least the second protocol buffer; communicating a current data packet sequence number; and forwarding data in the second communication mode.

19 Claims, 9 Drawing Sheets

APPARATUS AND METHOD FOR FLEXIBLE SWITCHING BETWEEN DEVICE-TO-DEVICE COMMUNICATION MODE AND CELLULAR COMMUNICATION MODE

TECHNICAL FIELD

The present application relates generally to an apparatus and a method for flexible switching between device-to-device (D2D) communication mode and cellular communication mode.

BACKGROUND

In a cellular network mode, data traffic usually goes through centralized controller such as a base station (BS) even if the communicating devices are close to each other. One benefit of the centralized operation is easy resource control and interference control. One potential drawback is less efficient resource utilization. A double amount of resources may be needed for a user equipment (UE) in a cellular mode. For example, a cellular UE may need to have a first radio resource allocated between the cellular UE and the base station and a second radio resource allocated between the base station and the other cellular UE. Examples of the centralized controller may include evolved Node B (eNB) of long-term evolution (LTE).

In comparison, a UE in a direct, device-to-device (D2D) mode may only need one radio resource between the UE and a pairing UE, when two users are sufficiently close to each other. To help improve system throughput, a radio network may operate in a D2D mode. A UE may operate in the cellular mode if the other party is located far way and may operate in the D2D mode if the pairing UE is sufficiently close by. Mixed cellular and D2D modes are being explored in new generations of wireless technologies such as $3^{rd}$ generation partnership project (3GPP) long-term evolution (LTE), LTE-advanced (LTE-A) and worldwide interoperability for microwave access (WiMax) networks. One example of D2D mode network is an ad-hoc network where one D2D UE may set up a direct connection with the pairing UE via a handshake and competition procedure. Examples of cellular networks include widely deployed wireless networks such as universal mobile telecommunications system (UMTS) network, code division multiple access (CDMA) network, WiMax network and 3GPP LTE networks.

It may become common to switch between the cellular communication mode and the D2D communication mode to accommodate a high degree of mobility, to support application and services such as location-based social networking, and to achieve more efficient resource utilization. The communication mode switch may involve the packet data convergence protocol (PDCP) that may perform packet header compression and decompression, transfer of user data and maintenance of protocol data unit (PDU) sequence numbers for radio bearers.

SUMMARY

Various aspects of the invention are set out in the claims.

In accordance with an example embodiment of the present invention, a method comprises receiving a control command to switch from a first communication mode to a second communication mode from a coupled controller; reconfiguring a plurality of protocol entities including at least a first protocol buffer and a second protocol buffer; moving remaining data packets in the first protocol buffer into at least the second protocol buffer; communicating a current data packet sequence number; and forwarding data in the second communication mode.

In accordance with an example embodiment of the present invention, a method comprises sending a measurement control command to at least a first UE and a second UE; receiving measurement reports from at least the first UE and the second UE; making a decision on switching from a first communication mode to a second communication mode based at least in part on the received measurement reports; setting up a plurality of protocol entities for at least the first UE and the second UE; and sending a switch command to at least the first UE and the second UE.

In accordance with another example embodiment of the present invention, an apparatus comprises a first module configured to receive a control command to switch from a first communication mode to a second communication mode from a coupled controller; to reconfigure a plurality of protocol entities including a first protocol buffer and a second protocol buffer; to move remaining data packets in the first protocol buffer into the second protocol buffer; to communicate a current data packet sequence number; and to forward data in the second communication mode.

BRIEF DESCRIPTION OF DRAWINGS

For a more complete understanding of example embodiments of the present invention, reference is now made to the following descriptions taken in connection with the accompanying drawings in which.

DETAILED DESCRIPTION

To support smooth and flexible switch between the cellular communication mode and the D2D communication mode with minimal data loss and low latency, the issues to be addressed may include synchronization of the data packet buffers on different devices and direct communication between the devices at the data link layer. The data packet buffers on different UEs and on the base station may need to be synchronized between the current communication mode and the new communication mode to minimize packet loss and duplicate packet transmissions during the communication mode transition. The direct communication at the data link layer, also termed layer 2, may avoid routing data packets through a core network, thus making the communication mode transition more efficient and less complicated.

An example embodiment of the present invention and its potential advantages are best understood by referring to FIGS. 1 through 9 of the drawings, like numerals being used for like and corresponding parts of the various drawings.

Figure 1A:
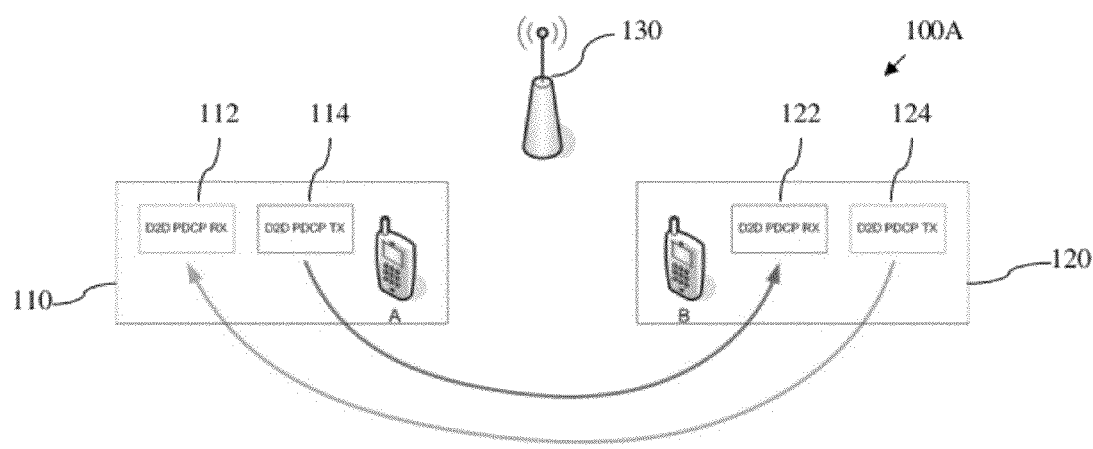
FIG. 1A illustrates one example wireless system in a D2D communication mode.

FIG. 1A illustrates one wireless system 100A that is switched into a D2D communication mode. The wireless system 100A may include a first user equipment 110, a second user equipment 120, and a base station 130. The user equipment 110 may include two protocol entities for the D2D mode communications, a D2D PDCP receiving entity 112 and a D2D PDCP transmitting entity 114. The user equipment 120 may include two protocol entities for D2D mode communications, a D2D PDCP receiving entity 122 and a D2D PDCP transmitting entity 124.

FIG. 1A may illustrate an example D2D communication scenario. In this example scenario, the D2D UE 110 may establish a D2D connection with the pairing D2D 120. When the UE 110 starts transmitting data packets to the UE 120, the UE 110 may first move data packets into the D2D PDCP transmitting entity 114 which may include a transmitting data buffer and transmit the data packet from the transmitting buffer. The data packets are directly sent to the receiving D2D PDCP entity 122 without going through the base station 130. In the reverse direction, when the UE 120 starts transmitting data packets to the UE 110, the UE 120 may first move data packets into the D2D PDCP transmitting entity 124 which may include a transmitting data buffer and transmit the data packet from the transmitting buffer. The data packets are directly sent to the receiving D2D PDCP entity 112 without going through the base station 130.

Figure 1B:
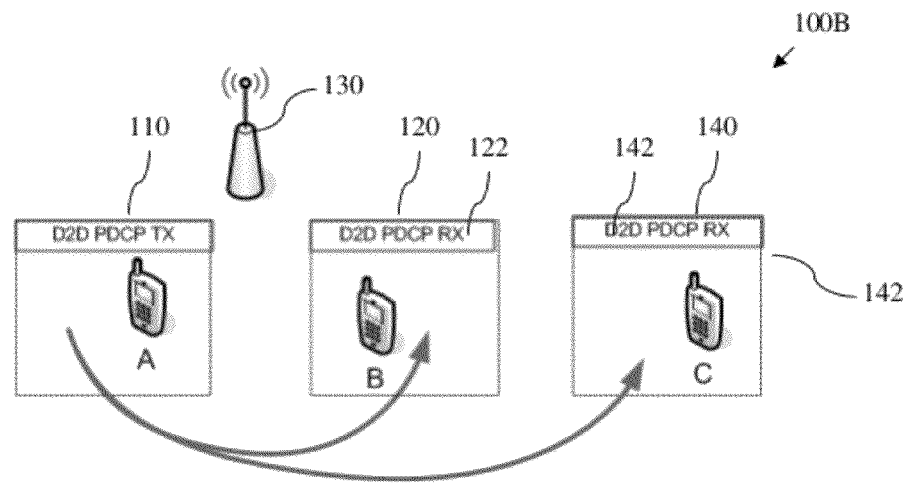
FIG. 1B illustrates one example wireless system in a multicast D2D communication mode.

FIG. 1B shows an example multicast wireless system 100B in the D2D mode. The multicast wireless system 100B, similar to the wireless system 100A, may include the UE 110, the UE 120, and the base station 130. In addition, the wireless system 100B may include a third UE 140. FIG. 1B may illustrate one configuration of PDCP entities in the D2D mode where the transmitting UE 110 may communicate with the receiving UE 120 and UE 140 at the same time in a multicast session. In the multicast session, the two PDCP receiving (RX) entities 122 and 142 may receive data from the transmitting UE 110 at the same time.

Figure 2A:
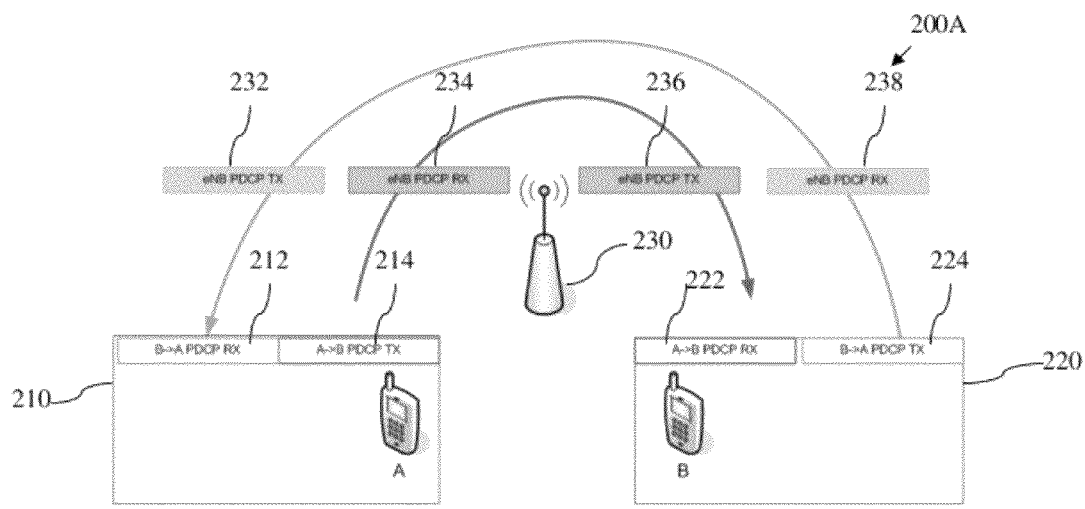
FIG. 2A illustrates one example wireless system in a cellular communication mode.

FIG. 2A illustrates one wireless system 200A that is switched into a cellular communication mode. The wireless system 200 may include a first user equipment 210, a second user equipment 220, and a base station 230. The user equipment 210 may include two protocol entities for a cellular mode communications, a PDCP receiving entity 212 and a PDCP transmitting entity 214. The UE 220 may include two protocol entities for the cellular mode communications, a D2D PDCP receiving entity 222 and a cellular PDCP transmitting entity 224.

The eNB base station 230 may include two pairs of protocol entities, a first pair of PDCP entities for the UE 210 and a second pair of protocol entities for the UE 220. The first pair of the protocol entities may include eNB PDCP transmitter 232 and eNB PDCP receiver 234. The second protocol pair may include an eNB PDCP receiver 236 and an eNB PDCP transmitter 238.

FIG. 2A may illustrate an example scenario where the two UEs switch from the D2D communication mode to the cellular communication mode. When the base station 230 makes a decision to switch from the D2D communication mode to the cellular communication mode, the pair of PDCP protocol entities 232, 234, 236 and 238 is created. When the UE 210 sends data packets to the UE 220, the data is sent by the A→B PDCP transmitting entity 214 of the UE 210 to the base station 230. The eNB PDCP receiving protocol entity 234 of the base station 230 receives the data packets and forwards them to the eNB PDCP transmitting protocol entity 236 of the base station 230, all within the base station 230. The eNB PDCP transmitting protocol entity 236 in turn sends the data packets to the A→B PDCP receiver protocol entity 222 of the UE 220. The data forwarding in the other direction from the UE 220 to the UE 210 in the cellular mode is similar, only in the other direction.

Figure 2B:
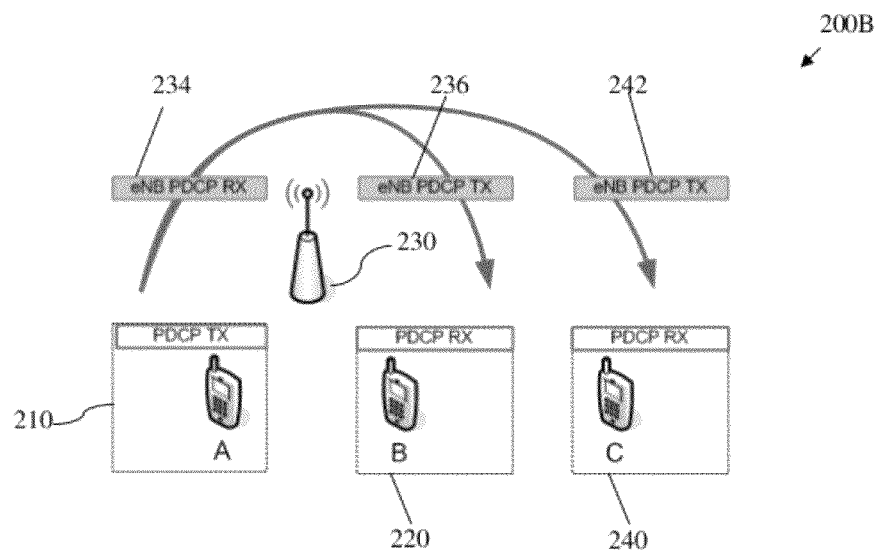
FIG. 2B illustrates one example multicast wireless system in a cellular communication mode.

FIG. 2B illustrates an example multicast wireless system 200B in a cellular mode. The multicast wireless system 200B may include an additional third UE 240. In this example cellular multicast session, the UE 210 may multicast to the UE 220 and the UE 240 via the base station 230. In this example embodiment, the base station 230 may have separate PDCP transmitting (TX) entities configured for the corresponding receiving UEs. The UE 210 may transmit multicast packets to PDCP RX 234 of the base station 230 which then may replicate and forward the multicast packets to the different PDCP TX entities 236 and 242 of the base station 230. The PDCP TX entities may unicast or multicast the multicast packets to the UE 220 and the UE 240.

Figure 3:
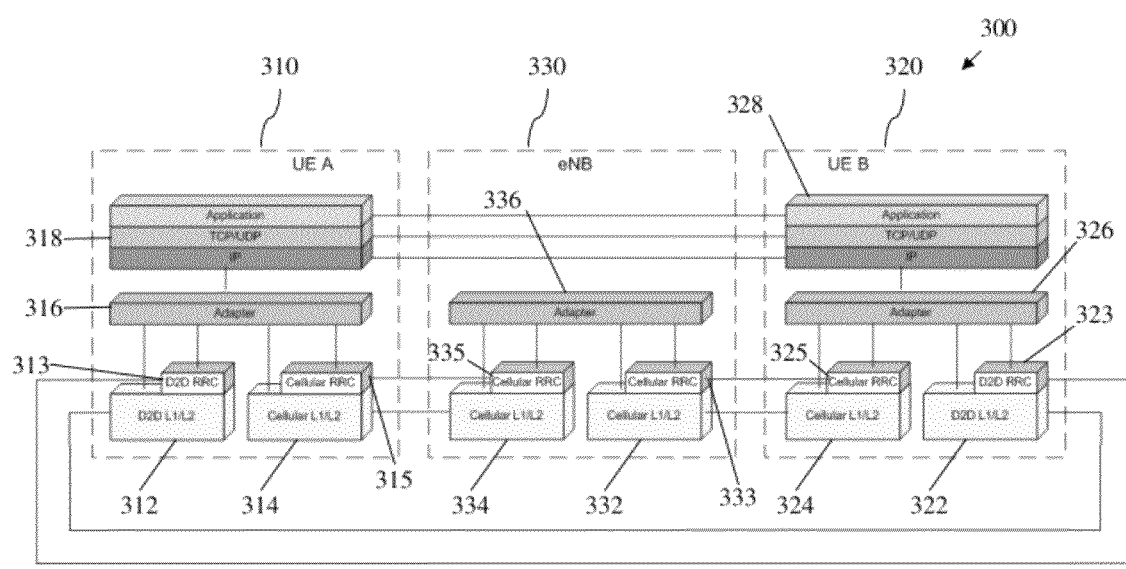
FIG. 3 illustrates an example protocol layer view of a wireless network system.

FIG. 3 illustrates an example protocol layer view of a wireless network 300. The protocol stack may include a physical layer, a data link layer, a network layer, a transport layer and an application layer. The physical layer, also termed layer 1 (L1) may perform encoding, decoding, multiplexing and demultiplexing of data, conversion between radio signals to digital signals, and the like. The data link layer, also termed layer 2 (L2), may transfer data between network entities and to detect and possibly correct errors that may occur in the layer 1. The network layer may route data packets in a packet network and the transport layer may deliver packets in sequence to a destination network node. The application layer may provide access to network applications and services.

The wireless network 300 may include a protocol stack 310 for the UE A, a protocol stack 320 for UE B, and a protocol stack 330 for base station eNB. The UE A protocol stack 310 in turn may include a layer 1 and layer 2 combined protocol entity 312 for the D2D communication mode, a D2D radio resource control (RRC) 313, a layer 1 and layer 2 protocol combination 314 for cellular communication mode, a cellular RRC 315, an adaptor 316, and upper layer protocol entity combination 318. Similarly the UE B protocol stack 320 in turn may include a layer 1 and layer 2 combined protocol entity 322 for D2D communication mode, a D2D RRC 323, a layer 1 and layer 2 protocol combination 324 for cellular communication mode, a cellular RRC 325, an adaptor 326, and upper layer protocol entity combination 328. The eNB protocol stack 330 may include a layer 1 and layer 2 combined protocol entity 332 and a D2D RRC 333 for the first UE in the cellular mode, a layer 1 and layer 2 protocol combination 334 and a cellular RRC 335 for the second UE in the cellular communication mode, and an adaptor 336.

The D2D L1/L2 combination 312, and 322 are the layer 1 and layer 2 entities to support D2D communications for the UE 310 and the UE 320 respectively. Similarly, cellular L1/L2 combination 314, 324, 332 and 334 are the layer 1 and layer 2 entities to support cellular communications for the UE 310, UE 320 and the base station eNB 333 respectively. The RRC may be part of the layer 3 function for wireless networks and may perform network layer control signalling between the UEs 310 and 320 and the eNB 330, manage radio resources such as radio channel allocation, radio resource usage monitoring and the like. The D2D RRC 313 and 323 may perform D2D signaling to support D2D communications for the UE 310, and UE 320 respectively. Similarly, the cellular RRCs 313, 323, 333, and 335 may perform cellular signaling to support cellular communications for the UE 310, UE 320 and the base station eNB 333 respectively. The combination 318 and 328 may perform the application layer functions such as providing access to network services for user applications, the transmission control protocol (TCP)/user data protocol (UDP) layer function such as in-sequence data transfer, and the IP layer function such as data packet routing.

The adaptors 316 and 326 of the UE 110 and the UE 210 may enable the two UEs to communicate directly and bypass packet routing through a core network. The adapter functionality may connect two or more PDCP entities on the user plane and may be located in the same network device such as an eNB or a UE.

The eNB adaptor 336 may connect PDCP entities in the eNB to enable "access point forwarding" where the intra cell traffic may be routed by bridging inside the eNB 330 without an involvement of a core network. In the UEs 110 and 210 and the eNB 310, the adapter functionality may be connected directly to various PDCP entities. The adapters 316, 326 and 336 may have an interface with the RRC layer entities such as the D2D RRC 313, the cellular RRC 315, and cellular RRC 333 and 335, to handle control plane functions. Each of the adaptors may configure lower layers such as D2D L1/L2 combination 312 and the cellular L1/L2 combination 314 via a RRC interface. The adapters 316, 326 and 336 may handle user plane data and forward the data between different PDCP entities or transmit the data to another forwarding node via a standard interface such as LTE X2 interface. The adapter 336 of the eNB may be viewed as an extension of an existing bridge.

Figure 4:
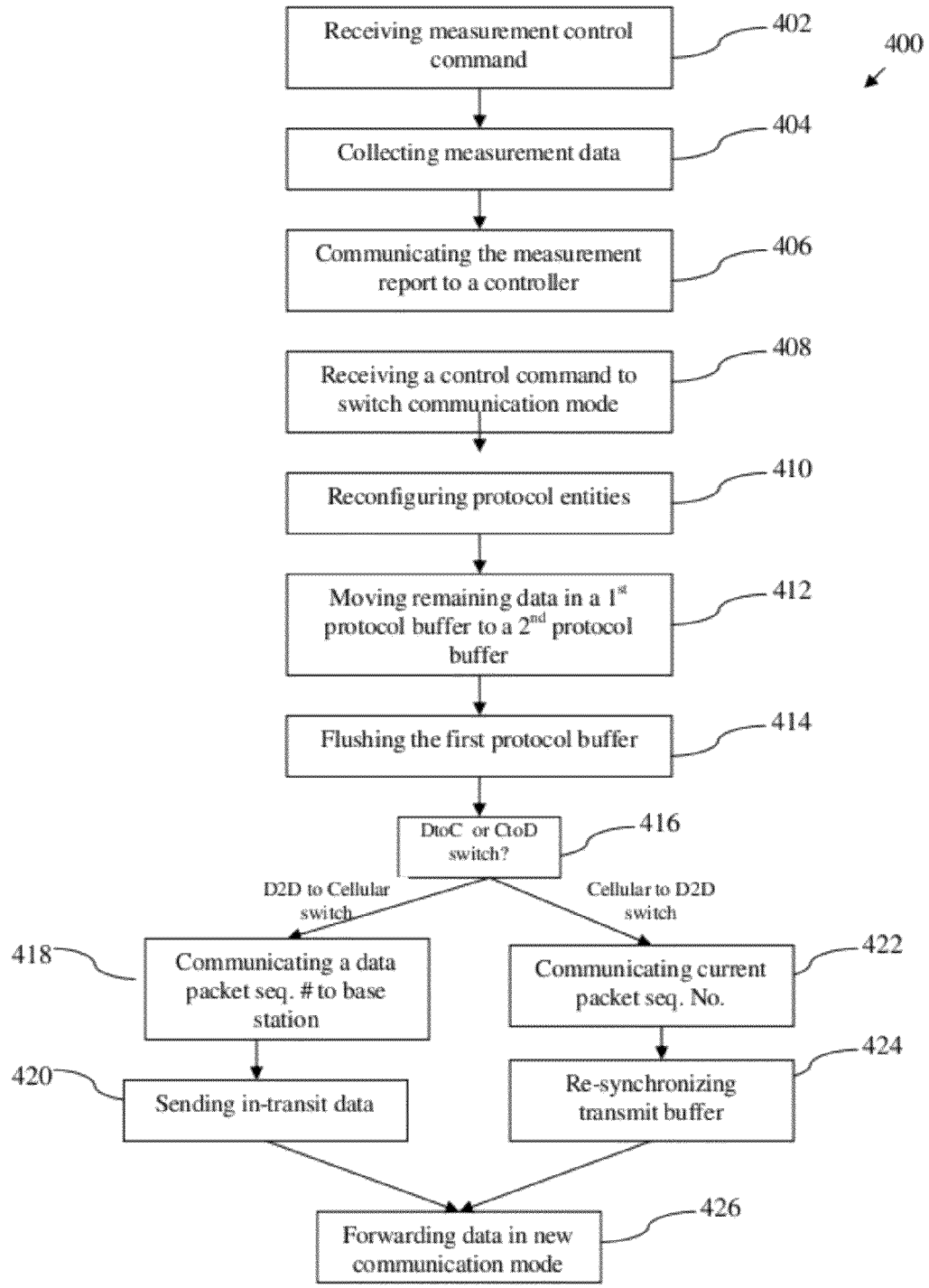
FIG. 4 illustrates an example method for mode switching at a UE.

FIG. 4 illustrates an example method 400 for mode switching at a UE. The method 400 may include receiving a measurement control command at block 402, collecting measurement data at block 404, and communicating the measurement report at block 406. The method 400 may also include receiving a control command to switch communication mode at block 408, reconfiguring protocol entities at block 410, moving remaining data in the first protocol buffer to a second protocol buffer at block 412, and flushing the first protocol buffer at block 416. The method 400 may also include communicating a current data packet sequence number to a coupled base station at block 418, sending the in-transit data packets to the base station at block 420 and forwarding data in the new communication mode at block 426 if the communication mode switch is from the D2D mode to the cellular mode as decided at block 416. The method 400 may also include communicating the current data packet sequence number to a peer or paring UE at block 422 and re-synchronizing transmitting buffer at block 424 and forwarding data in the new mode at block 426, if the communication mode switch is from the cellular to D2D communication mode at the block 416. In one example embodiment, the method 400 may be implemented in the UE 110 and UE 120 of FIG. 1A, and the UE 210 and the UE 220 of FIG. 2A.

Receiving the measurement control command at block 402 may include receiving a control signaling by a UE such as the UE 110 from the coupled base station such as the eNB 130 of FIG. 1A or the eNB 230 of FIG. 2A to collect measurement data. Receiving the control signaling may take place at scheduled time intervals or triggered by an event at the base station.

Collecting measurement data at block 404 may include collecting measurement data such as a link throughput, signal power strength, noise level, noise to signal ratio, and the like at the UE and generating a measurement data report. Communicating the measurement report at block 406 may include sending the measurement data report to the base station via an uplink allocated by the base station.

Receiving a control command to switch communication mode at block 408 may include receiving a control signaling from the coupled base station to switch from the current communication mode to a different communication mode. For example, the current communication mode may be the D2D mode and the target mode may be the cellular mode.

Reconfiguring the protocol entities at block 410 may include creating one or more new protocol entities such as a protocol buffer and one or more protocol transmitting or receiving entities. In one embodiment, reconfiguring the protocol entities may include creating a PDCP transmitting buffer to hold the PDCP packets to be transmitted and a PDCP receiving buffer to receive PDCP packets in either the cellular mode or the D2D mode. Reconfiguring protocol entities at block 410 may also include cleaning up an existing protocol entity that is no longer needed.

Moving remaining data in the first protocol buffer to a second protocol buffer at block 412 may include moving data packets from a previous protocol buffer into a newly created protocol buffer and the moved packets may be transmitted in the new communication mode. In one example embodiment, data packets are moved from the cellular PDCP buffer into a D2D PDCP buffer and the remaining packets may be transmitted in the new D2D communication mode. Flushing the previous protocol buffer at block 414 may include releasing the space allocated for the previous protocol buffer after the remaining data packets have been moved to the new protocol buffer.

If the switching decision is from the D2D mode to the cellular mode, communicating the current data packet sequence number to a coupled base station at block 418 may include sending the UE's current data packet sequence number to the coupled base station. The current packet sequence number indicates the next packet that the UE expects to receive. Sending the in-transit data packets to the base station at block 420 may include sending the data packets already in the transmitting buffer to the base station. Forwarding new data packets in the new communication mode at block 426 may include forwarding data packets in the cellular mode to the pairing UE via the base station from this point on.

If the switching decision is from the cellular mode to the D2D mode, communicating the current data packet sequence number at block 422 may include sending the current packet sequence number of this UE to at least one pairing UE. Communicating the current data packet sequence number may also include receiving a packet sequence from the paring UE at block 422. Re-synchronizing transmitting buffer at block 424 may include organizing the packets in the transiting buffer based on the received packet sequence number in such a way that the packets are in appropriate order as they are expected by the pairing UE. Then the communication continues in the new D2D mode.

Figure 5:
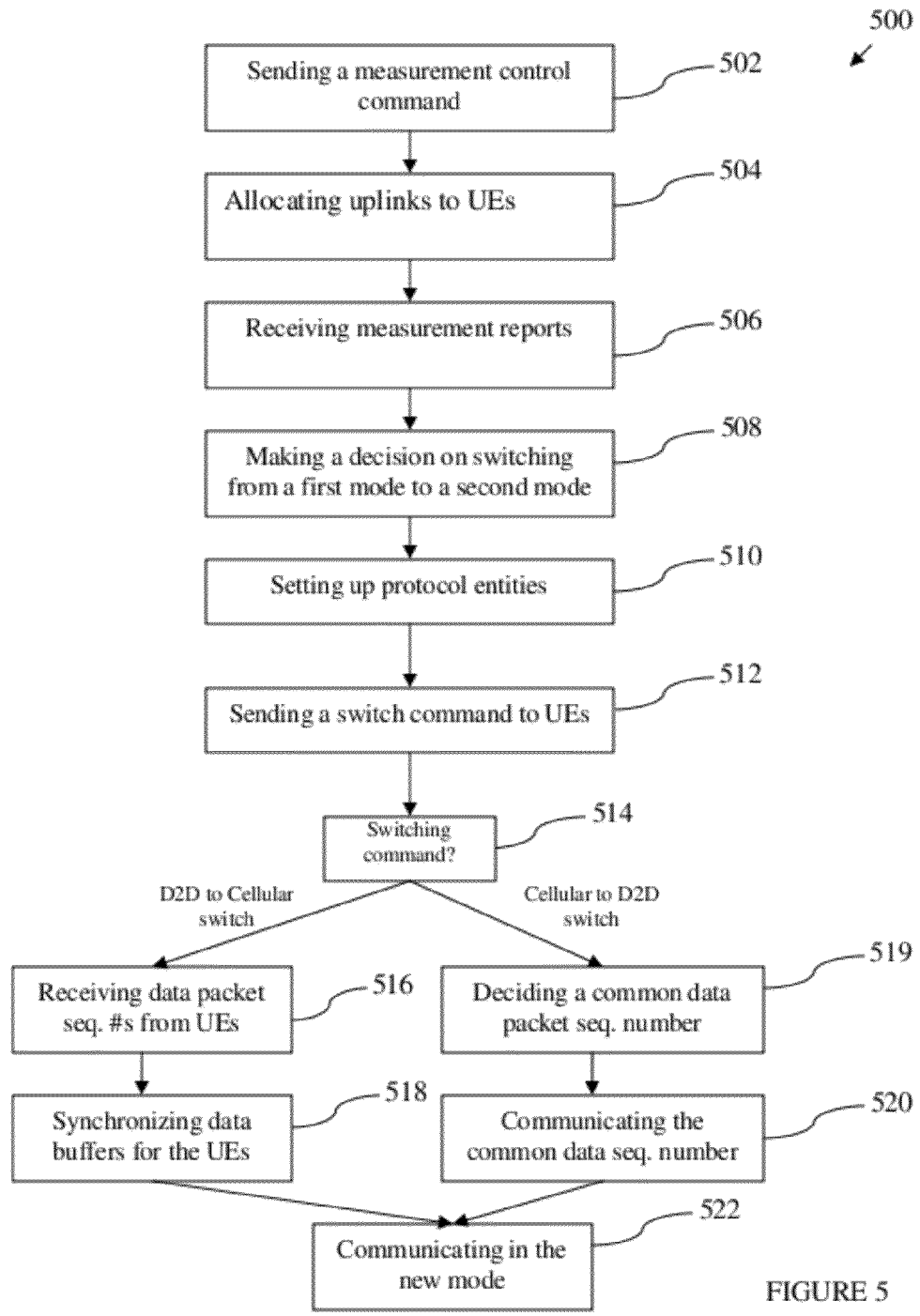
FIG. 5 illustrates an example method for mode switching at a base station.

FIG. 5 illustrates an example method 500 for switching communication mode at a base station. The method 500 may include sending a measurement control command at block 502, allocating uplinks to a first UE and a second UE at block 504, and receiving measurement reports at block 506. The method 500 may also include making a decision on switching from a first communication mode to a second communication mode at block 508, setting up protocol entities at block 510, and sending a switching command to the first UE and the second UE at block 512. If the switching command is from the D2D mode to the cellular mode at block 514, then the method 500 may further include receiving data packet sequence numbers from the UEs at block 516 and synchronizing data buffers for the UEs at block 518. The method may also include deciding a common data packet sequence number at block 519 and sending the current data packet sequence numbers to the UEs at block 520 if the switch command is from the cellular mode to the D2D mode at the block 514. In one example embodiment, the method 500 may be implemented in the eNB 130.

Sending the measurement control command at block 502 may include signaling the pair of UEs such as the UE 110 and UE 120 of FIG. 1A to collect measurement data at the UEs. Sending the measurement control command may be triggered by an event or on a scheduled basis. A plurality of events may trigger the base station to send measurement control signaling. For example, the triggering event may include a certain amount of resources becoming available, crossing of quality of service (QoS) threshold, and the like. Allocating uplinks to the UEs at block 504 may include allocating appropriate uplink resources for the UE to send back the collected measurements. Receiving measurement reports at 506 may include receiving the measurement reports from both the UEs on the previously allocated uplinks.

Making a decision on switching from the first communication mode to a second communication mode at block 508 may include considering the measurement reports received from the UEs, available resources at the base station for the new communication mode, QoS criteria for a connection to be set up in the new communication, and the like, before deciding to switch from the current communication mode to the new communication mode. Setting up protocol entities at block 510 may include creating protocol entities such as PDCP RX and PDCP TX within the UE. Sending a switching command to the first UE and the second UE at block 512 may include signaling the UEs to switch from the current mode to the new communication mode once a switch decision is made.

If the switching decision is from the D2D mode to the cellular mode, then the method 500 may further include receiving data packet sequence numbers from the UEs at block 516 and synchronizing data buffers for the UEs at block 518. Receiving the data packet sequence numbers from the UEs at block 516 may include receiving one packet sequence number from each UE to indicate the next packet that the UE expects the base station to send. Synchronizing the data buffers for the UEs at block 518 may include discarding duplicate packets and reordering the packets in the data packet buffer based on the received packet sequence number. Communicating in the new mode at block 522 may include sending and receiving data packets in the cellular mode from this point forward.

If the switching decision is from the cellular mode to the D2D mode, optional steps may include deciding a common packet sequence number at block 519 and communicating the sequence number at block 520. Deciding a common data packet sequence number at block 519 may include collecting from the UEs two or more data packet sequence numbers, comparing the collected data packet sequence numbers, and selecting the smallest one as the current common data packet sequence number, if it is a multicast session. Two data packet sequence numbers may be collected if two UEs are involved in unicast communication. More than two data packet sequence numbers may be collected for multicast communication. Communicating the current data packet sequence numbers to the UEs at block 520 may include sending the packet sequence numbers of both UEs in the D2D mode to each UE such as the UE 110 or UE 120 of FIG. 1A. Thus, each UE may know the next packets it may send and the next packet it may expect from the paring UE. Communicating in the new mode at block 522 may include sending and receiving data packets in the D2D mode from this point forward between the pair of D2D UEs such as the UE 110 and UE 120 of FIG. 1A. Alternatively, once the switch from the cellular mode to the D2D mode is completed, the more UEs as in FIG. 1A or more than two UEs as in FIG. 1B, may exchange the packet sequence numbers in the D2D mode without the involvement of the base station.

Figure 6:
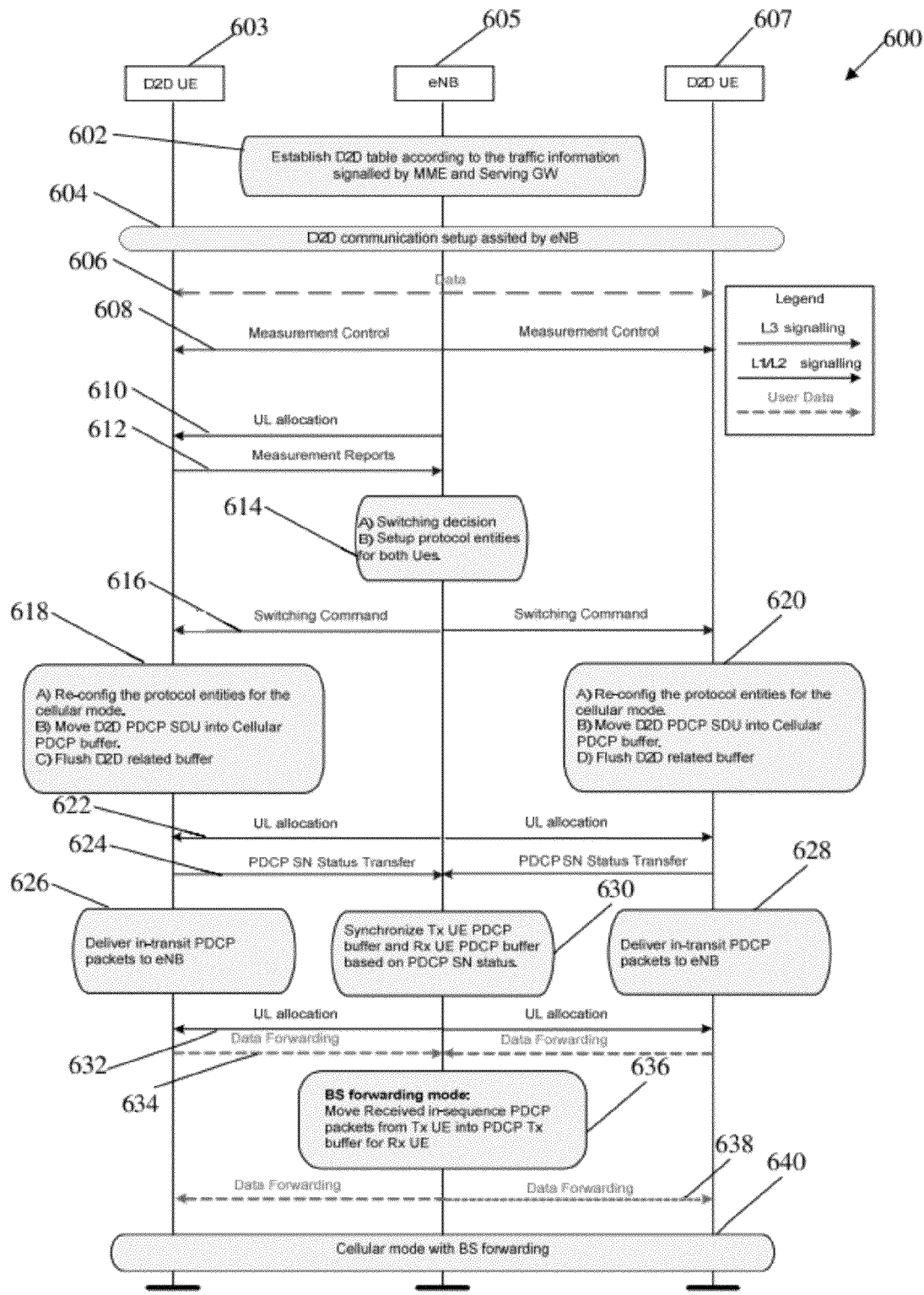
FIG. 6 illustrates an example flowchart diagram for switching from a D2D mode to a cellular mode.

FIG. 6 illustrates an example flowchart diagram 600 for switching from the D2D mode to the cellular mode. The flowchart diagram 600 illustrates a scenario where two UEs, the D2D UE 603 and the D2D UE 607 are communicating in the D2D mode, and the two UEs together with eNB 605 then switch from the D2D mode to a cellular mode. The starting point of the transition is that the eNB establishes a D2D table according to traffic information signaled by the core network nodes such as mobility management entity (MME) and one or more serving gateways at step 602. Then a D2D communication is set up at step 604. From this point, the pair of UEs, the UE 603 and the UE 607 communicate with each other in the D2D mode.

During the normal data transmission at step 606 in the D2D mode, the eNB 605 may decide to check whether there is a need for switch from the current D2D mode to the cellular mode. A plurality of items may trigger the eNB 605 to perform this check and subsequent decision on switch from one communication mode to another mode. For example, the triggering event may include certain amount of resource becoming available, crossing of QoS threshold, and the like.

The step 608 illustrates that the communication mode switch decision is triggered at the eNB 605, which in turn sends a measurement control command to the UE 603 and the UE 607 respectively, to request measurement data from the UEs. Then the eNB 605 allocates uplink resource to the UE in need at the step 610 for the UEs to send measurement data report.

In response to the measurement control command, the UEs collect measurement data, create a measurement report and send the measurement report to the eNB 605 at the step 612. Based on the measurement report received from the UEs, the eNB 605 may make a decision to switch from the current D2D communication mode to the cellular communication mode at the step 614. Also at the step 614, the eNB 605 sets up the protocol entities such as the eNB PDCP transmitting entity 232, the eNB PDCP receiving entity 234, the eNB PDCP receiving entity 236 and the eNB PDCP transmitting entity 238 in FIG. 2A.

The eNB 605 sends a control command to both the UEs to initiate a switch from the current D2D communication mode to the cellular mode at the UEs at step 616. In response to the switch command, each of the UEs 603 and 607 may reconfigure the protocol entities for the target cellular communication mode, move the data from the current D2D protocol buffers to the cellular protocol buffer, and flush the previous protocol buffer at the step 618 and step 620 respectively. Reconfiguring the protocol buffer may include creating a new protocol buffer for the cellular mode. In one example embodiment, a PDCP protocol buffer is created for the cellular mode and PDCP data units are moved from the existing D2D PDCP buffer to the cellular PDCP buffer and the previous D2D PDCP buffer is flushed.

The eNB 605 may also allocate uplink resources to the UEs at the step 622 for the UEs to send the signaling data. Using the allocated uplink resource, both the UEs send their respective current data packet sequence number to the eNB 605 at the step 624 so the eNB 605 may know which data packet to send next. Then both the UEs send their in-transit data packets to the eNB 605 at the step 626 and the step 628. The eNB 605 then may synchronize the received data packets from the UEs in the transmitting and receiving PDCP buffers at the step 630 based on the received current data packet sequence numbers. Duplicate data packets may be discarded and the missing data packets may be requested for retransmission.

The eNB 605 may allocate uplink resources to the UEs at the step 632 this time for data transmission. From this point on, the UEs are operating in the cellular communication mode. The UE 603 may first forward data to the eNB 605 that is destined for the receiving UE 607 at the step 634. Similarly, the UE 605 may first forward data to the eNB 605 that is destined for the receiving UE 603 at the step 634 as well. The eNB 605 may internally transfer the received data from the receiving PDCP buffer to the transmitting buffer for each UE at the step 636. The eNB 605 then may send the data packets to their destined UE from the respective transmitting protocol buffer at the step 638. The example wireless system continues operation in the cellular mode at the step 640.

Figure 7:
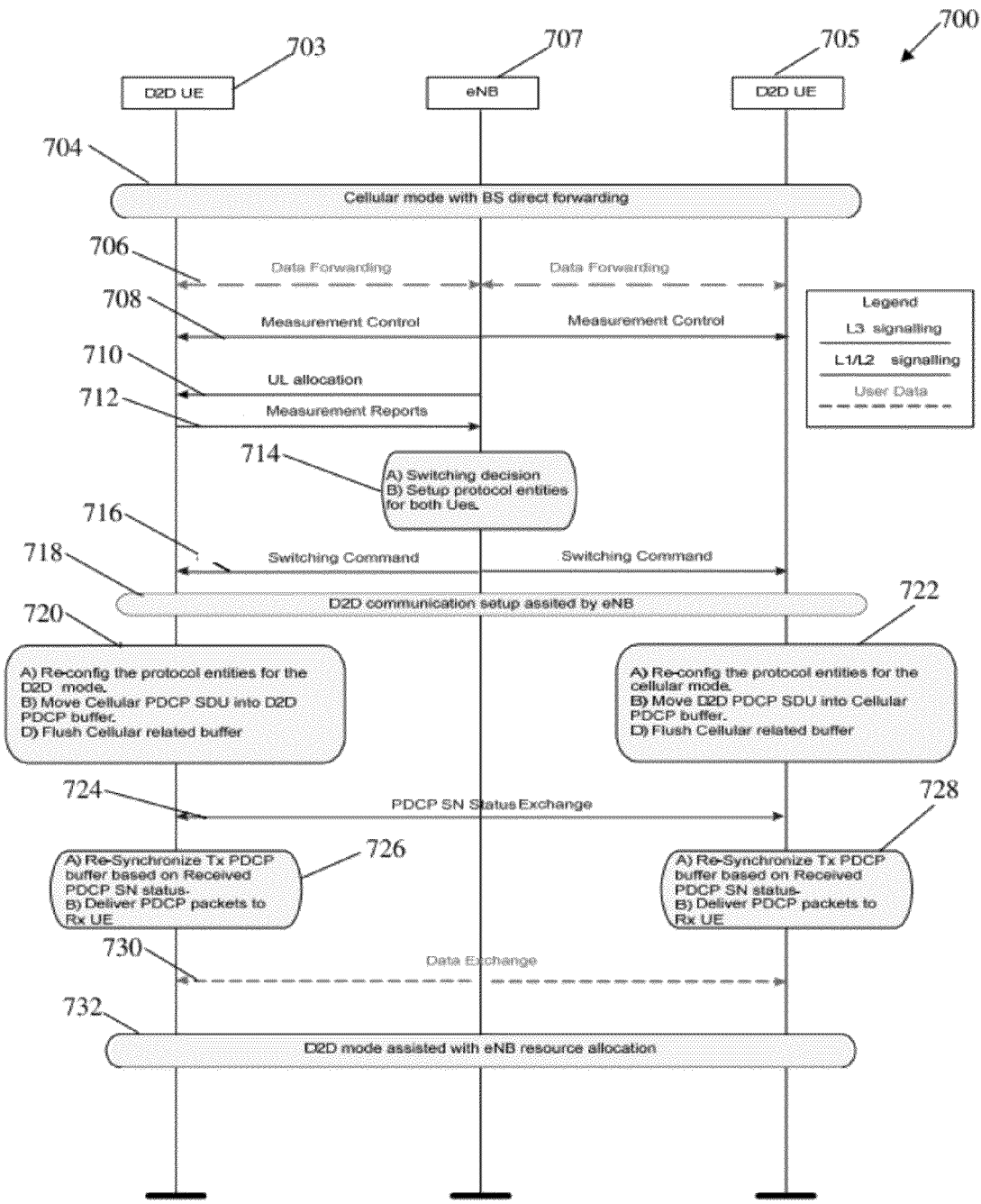
FIG. 7 illustrates an example flowchart diagram for switching from a cellular mode to a D2D mode.

FIG. 7 illustrates an example flowchart diagram for switching from the cellular mode to the D2D mode. The two UEs 703 and 705 are communicating in the cellular mode by sending data to each other via the eNB 707 at the step 704 and the step 706. Once a triggering event takes place, the eNB 707 may send measurement control command to the UEs 703 and 705 to collect the measurement data from the UEs at the step 708 and allocate the uplink resources to the UEs at the step 710 to send the collected measurement data.

The UEs in response may collect the measurement data at the respective UE and send the measurement data to the eNB 705 at the step 712. Based on the collected UE measurement data, the eNB 705 may make a decision to switch from the current cellular communication mode to the D2D communication mode and set up the corresponding protocol entities include protocol buffers a the step 714. The eNB 705 may send the switching command to the UEs at the step 716 and assist the setup and preparation at the UEs at the step 718.

The UE 703 at the step 720 and UE 705 at the step 722 respectively set up their respective UE for the D2D mode communication. The setup operation may include reconfiguring protocol entities including protocol buffers, moving existing data packets from the existing protocol buffers to the new protocol buffers, and flushing the existing protocol buffer. In one embodiment, the PDCP buffers are created for D2D communication mode, existing data packets are moved from the existing cellular PDCP buffer into the new D2D PDCP buffers and the existing cellular PDCP buffers are flushed.

The eNB 707 may send the current data packet sequence number to the respective UE at the step 724. With the current data packet sequence number, the UE 703 and UE 705 may re-synchronize its respective transmitting buffer at the step 726 and the step 728 because each UE knows which packet to send next to the other UE. From this point on, the UE pairs 703 and 705 start communicating in the D2D mode at the step 730 and the step 732 by sending data packets directly to each other using the resources allocated by the eNB 705.

Figure 8:
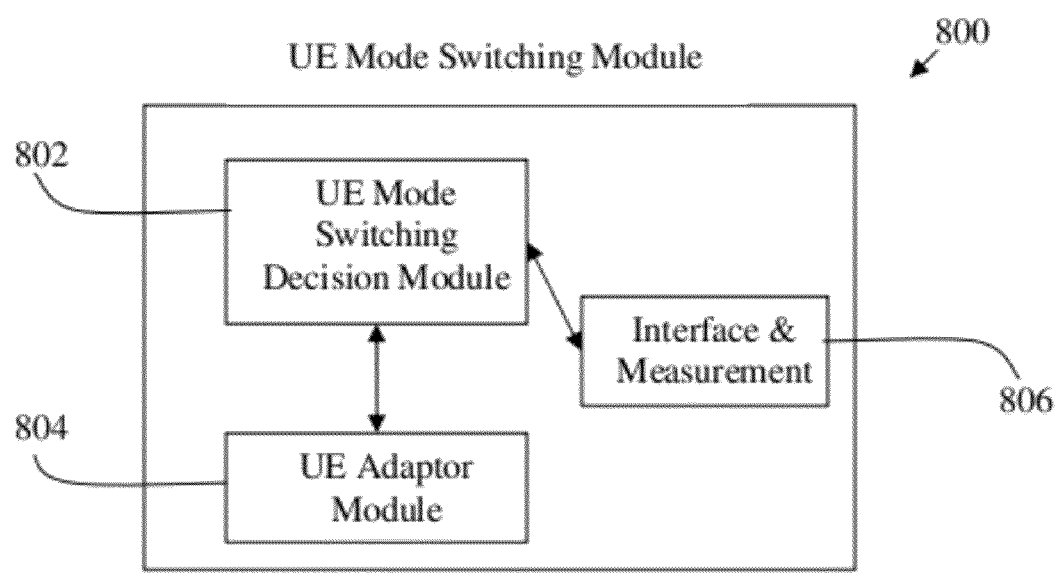
FIG. 8 illustrates an example UE mode switching module.

FIG. 8 illustrates an example mode switching module 800. The mode switching module 800 may be implemented at any of the UEs such as the UEs 110 and 120 of FIG. 1A, the UEs 210 and 220 of FIG. 2A and the like. The mode switching module 800 may include a mode switching decision module 802, an interface and measurement module 804 and a UE adaptor module 806.

The mode switching decision module 802 may be configured to receive a control command from the coupled eNB to switch from a first communication mode to a second communication mode, and reconfigure a plurality of protocol entities including a D2D PDCP protocol buffer and a cellular PDCP protocol buffer. The mode switching decision module 802 may also move remaining data packets in between the protocol buffers, depending the direction of the mode switching, from the cellular mode to the D2D mode or vice versa. The mode switching decision module 802 also may be configured to flush the first protocol buffer, communicate a current data packet sequence number, and forward data in the switched-to communication mode.

The interface & measurement module 804 may be configured to receive a measurement control command from the coupled eNB, collect a plurality of measurement data, create a measurement report including the plurality of measurement data and communicate the measurement report to the coupled controller before receiving the control command. The adaptor module 806 may be configured to connect the first layer 2 protocol entity to the second layer 2 protocol entity and to forward a plurality of data packets between the first layer 2 protocol entity and the second layer 2 protocol entity.

Figure 9:
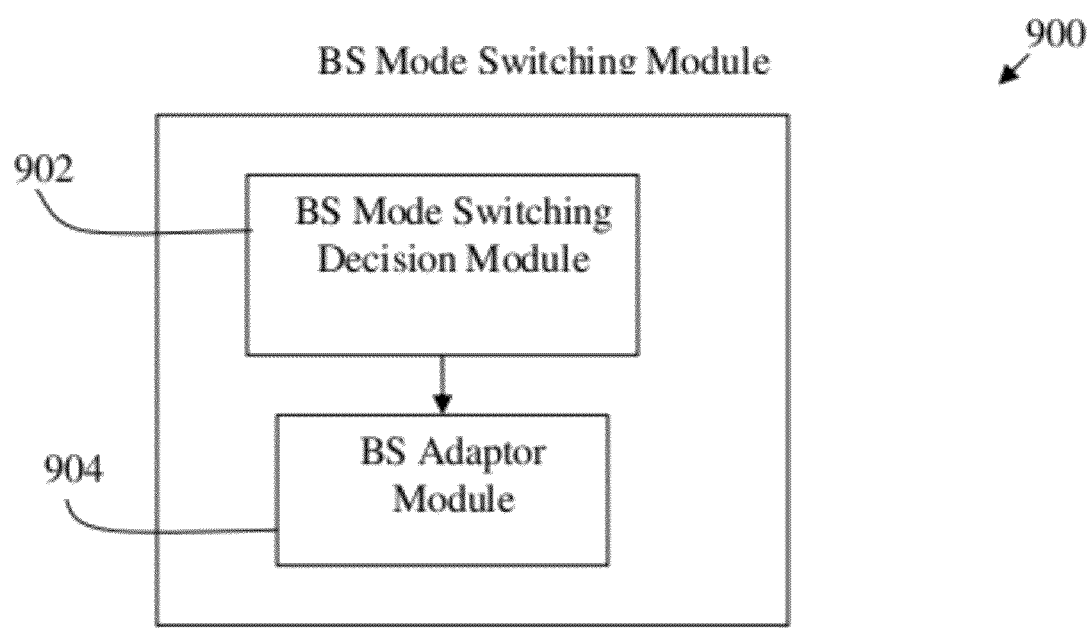
FIG. 9 illustrates an example BS mode switching module.

FIG. 9 illustrates an example BS mode switching module 900 at a base station such as eNB 130, 230, 330 of FIGS. 1, 2, and 3. The BS mode switching module 900 may include a BS mode switching decision module 902 and a BS adaptor module 904. The BS mode switching decision module 902 may be configured to send a measurement control command to a first UE and a second UE; to receive measurement reports from the first UE and the second UE; to make a decision on switching from a first communication mode to a second communication mode based at least in part on the received measurement reports. The BS mode switching decision module 902 may also be configured to set up a plurality of protocol entities for the first UE and the second UE; and to send a switch command to the first UE and the second UE. The adaptor module 904 may be configured to connect the first pair of layer 2 protocol entities to the second pair of layer protocol entities, and to forward a plurality of data packets between the first pair of layer 2 protocol entities and the second pair of layer 2 protocol entities in a cellular mode.

Without in any way limiting the scope, interpretation, or application of the claims appearing below, a technical effect of one or more of the example embodiments disclosed herein may be a method for switching between the cellular communication mode and the D2D communication based at least in part on the current packet sequence number.

Embodiments of the present invention may be implemented in software, hardware, application logic or a combination of software, hardware and application logic. The software, application logic and/or hardware may reside on a mobile station or user equipment, a base station or other mobile computing device. If desired, part of the software, application logic and/or hardware may reside on a mobile station, part of the software, application logic and/or hardware may reside on a base station, and part of the software, application logic and/or hardware may reside on a second mobile station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. A method, comprising:
receiving at a user equipment a control command to switch from a first communication mode to a second communication mode from a coupled controller wherein the first communication mode is one of a cellular mode and a device-to-device (D2D) mode, the second communication mode is one of the cellular mode and the D2D mode, and the first communication mode is different from the second communication mode;
reconfiguring at the user equipment a plurality of protocol entities including at least a first protocol transmit buffer and a second protocol transmit buffer;
moving at the user equipment remaining data packets in the first protocol transmit buffer into at least the second protocol transmit buffer;
communicating from the user equipment a current data packet sequence number of a packet expected to be received by the user equipment; and
forwarding from the user equipment data in the second communication mode.

2. The method of claim 1, further comprising:
receiving a measurement control command from the coupled controller;
collecting a plurality of measurement data; and
communicating the measurement report to the coupled controller before receiving the control command.

3. The method of claim 1, wherein forwarding data in the second communication mode comprise forwarding data in one of a unicast session and a multicast session in the second communication mode.

4. The method of claim 1, wherein communicating the current data packet sequence number comprises:
sending the current packet sequence number to the coupled controller when the first communication mode is the D2D mode and the second communication mode is the cellular mode; and sending the current packet sequence number to at least one pairing user equipment when the first communication mode is the cellular mode and the second communication mode is the D2D mode.

5. The method of claim 4, further comprising delivering one or more in-transit data packets to the coupled controller.

6. The method of claim 4, wherein communicating the current data packet sequence number further comprises receiving a second current packet sequence number from the at least one pairing user equipment.

7. The method of claim 6, further comprising:
re-synchronizing transmitting PDCP buffers based on the second received current packet sequence number; and delivering PDCP packets to the at least one pairing user equipment.

8. The method of claim 1, further comprising flushing the first protocol buffer.

9. The method of claim 1, wherein reconfiguring the plurality of protocol entities further comprises at least one of creating at least one new protocol entity, destroying at least one existing protocol entities, and modifying at least one existing protocol entities, wherein the at least one protocol entities are packet data control protocol (PDCP) entities.

10. A method, comprising:
sending from a base station a measurement control command to at least a first user equipment and a second user equipment;
receiving at the base station measurement reports from at least the first user equipment and the second user equipment;
making a decision at the base station on switching the at least first and second user equipment from a first communication mode to a second communication mode based at least in part on the received measurement reports;
setting up a plurality of protocol entities at the base station for at least the first user equipment and the second-user equipment;
sending a switch command to at least the first user equipment and the second-user equipment;
reconfiguring at the user equipment a plurality of protocol entities including at least a first protocol transmit buffer and a second protocol transmit buffer; and
moving at the user equipment remaining data packets in the first protocol transmit buffer into at least the second protocol transmit buffer;
wherein the first communication mode is one of a cellular mode and a device-to-device (D2D) mode, the second communication mode is one of the cellular mode and the D2D mode, and the first communication mode is different from the second communication mode.

11. The method of claim 10, further comprising allocating at least one uplink to the first user equipment and at least one uplink for the second user equipment for the first and second user equipments to transmit the measurement reports.

12. The method of claim 11, further comprising
collecting one current data packet sequence number from each of at least the first user equipment and the second user equipment;
deciding a common data packet sequence number by comparing the collected current data packet sequence numbers;
sending the common data packet sequence number to at least the first user equipment and the second-user equipment when the first communication mode is the cellular mode and the second communication mode is the D2D mode.

13. The method of claim 11, further comprising
receiving a first data packet sequence number from the first user equipment;
receiving a second data packet sequence number from the second user equipment; and
synchronizing a first user equipment data buffer for the first user equipment and a second user equipment data buffer for the second user equipment based at least in part on the received first data packet sequence number and the received second data packet sequence status when the first communication mode is the D2D mode and the second communication mode is the cellular mode.

14. An apparatus, comprising:
a non-transitory first module configured:
   to receive a control command to switch from a first communication mode to a second communication mode from a coupled controller;
   to reconfigure a plurality of protocol entities including a first protocol transmit buffer and a second protocol transmit buffer;
   to move remaining data packets in the first protocol transmit buffer into the second protocol transmit buffer;
   to communicate from the user equipment a current data packet sequence number of a packet expected to be received by the user equipment; and
   to forward data in the second communication mode;
   wherein the first communication mode is one of a cellular mode and a device-to-device (D2D) mode, the second communication mode is one of the cellular mode and the D2D mode, and the first communication mode is different from the second communication mode.

15. The apparatus of claim 14, further comprising a second module configured:
   to receive a measurement control command from the coupled controller;
   to collect a plurality of measurement data;
   to create a measurement report including the plurality of measurement data; and
   to communicate the measurement report to the coupled controller before receiving the control command.

16. The apparatus of claim 14, further comprising:
a first layer 2 protocol entity;
a second layer 2 protocol entity; and
an adaptor module configured:
   to connect the first layer 2 protocol entity to the second layer 2 protocol entity; and
   to forward a plurality of data packets between the first layer 2 protocol entity and the second layer 2 protocol entity.

17. The apparatus of claim 14, wherein the apparatus is coupled to a controller configured:
   to send a measurement control command to at least a first user equipment and a second user equipment;
   to receive measurement reports from at least the first user equipment and the second user equipment;
   to make a decision on switching from a first communication mode to a second communication mode based at least in part on the received measurement reports;
   to set up a plurality of protocol entities for at least the first user equipment and the second user equipment; and
   to send a switch command to at least the first user equipment and the second user equipment.

18. The apparatus of claim 17, wherein the controller further comprises:
   a first pair of protocol entities for the first user equipment;
   a second pair of protocol entities for a second user equipment; and
   an adaptor configured:
      to connect the first pair of layer 2 protocol entities to the second pair of layer 2 protocol entities; and
      to forward a plurality of data packets between the first pair of layer 2 protocol entities and the second pair of layer 2 protocol entities in the cellular mode.

19. The apparatus of claim 17, wherein the controller is one of a long-term evolution (LTE) node B (eNodeB), LTE-advance (LTE-A) eNodeB, an access point, and a routing node in a local area network, and one of the first user equipment and the second user equipment is one of a LTE terminal, LTE-A terminal, a $4^{th}$ generation (4G) terminal, and a client device on a network.

* * * * *